US007991415B2

(12) United States Patent
Usuda et al.

(10) Patent No.: US 7,991,415 B2
(45) Date of Patent: Aug. 2, 2011

(54) TRANSMISSION RATE CONTROL METHOD, RADIO BASE STATION AND RADIO NETWORK CONTROLLER

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 638 days.

(21) Appl. No.: 11/886,869

(22) PCT Filed: Mar. 22, 2006

(86) PCT No.: PCT/JP2006/305685
§ 371 (c)(1),
(2), (4) Date: Nov. 5, 2007

(87) PCT Pub. No.: WO2006/101115
PCT Pub. Date: Sep. 28, 2006

(65) Prior Publication Data
US 2008/0139134 A1    Jun. 12, 2008

(51) Int. Cl.
*H04B 7/00*    (2006.01)
(52) U.S. Cl. ............... 455/517; 455/67.11; 455/450; 455/452.1; 370/232; 370/235
(58) Field of Classification Search ............ 455/67.11, 455/69, 95, 442, 436, 435.1, 561, 450, 452.1, 455/423, 453, 522; 370/335, 329, 328, 235, 370/232, 394, 333
See application file for complete search history.

(56) References Cited

U.S. PATENT DOCUMENTS

| 5,914,950 | A | 6/1999 | Tiedemann, Jr. et al. |
| 2002/0039355 | A1 | 4/2002 | Yun et al. |
| 2005/0013303 | A1* | 1/2005 | Gopalakrishnan et al. ............ 370/395.21 |
| 2008/0192685 | A1* | 8/2008 | Usuda et al. ............ 370/329 |
| 2008/0207216 | A1* | 8/2008 | Usuda et al. ............ 455/453 |
| 2009/0137242 | A1* | 5/2009 | Goto et al. ............ 455/423 |

(Continued)

FOREIGN PATENT DOCUMENTS
JP    2001-519123    10/2001
(Continued)

OTHER PUBLICATIONS

3GPP TS 25.309 V6.2.0 (Mar. 2005), 3rd Generation Partnership Project; Technical Specification Group Radio Access Network; FDD Enhanced Uplink; Overall description; Stage 2 Release 6, p. 1-p. 30.

(Continued)

*Primary Examiner* — Sujatha Sharma
(74) *Attorney, Agent, or Firm* — Marvin A. Motsenbocker; Mots Law, PLLC

(57) ABSTRACT

The present invention provides a transmission rate control method for controlling the transmission rate of uplink user data, including the step of; a radio network controller notifies to a radio base station and a mobile station an effective period of an absolute transmission rate control channel, when a call is established or when a serving cell is changed; a radio base station determines whether or not to transmit the absolute transmission rate control channel to each of mobile stations which is performing a communication with the radio base station; and each of the mobile stations determines the transmission rate of the uplink user data, based on a maximum allowable transmission rate mapped to the absolute transmission rate control channel notified by the radio base station.

9 Claims, 9 Drawing Sheets

U.S. PATENT DOCUMENTS

2009/0225726 A1* 9/2009 Hanaki et al. .............. 370/335
2009/0227256 A1* 9/2009 Goto et al. .............. 455/435.1

FOREIGN PATENT DOCUMENTS

| JP | 2003-536348 | 12/2003 |
| JP | 2004-215276 | 7/2004 |
| KR | 2001-0006192 A | 1/2001 |
| KR | 2001-0006192 B | 1/2001 |
| WO | 98/45966 A2 | 10/1998 |
| WO | WO 2004/064426 A1 | 7/2004 |

OTHER PUBLICATIONS

"Universal Mobile Telecommunications System (UMTS); FDD enhanced uplink; Overall description; Stage 2 (3GPP TS 25.309 ver.6.1.0 Release 6); ETSI TS 125 309" ETSI Standards, LIS, Sophia Antipolis Cedex, France, vol. 3-R2, No. V6.1.0, Dec. 1, 2004, XP014027652.

NEC "Support of GBR and per-flow basis rate control in enhanced uplink" TSG-RAN WG1, [Online] No. R1-04-0301, Feb. 16-20, 2004 pp. 1-3, XP002496085.

Mitsubishi Electric: "Definition and signaling way of time duration" 3GPP TSG RAN WG1#40,[0nline]Feb. 14-18, 2005 p. 1-3, XP002496086.

Motorola: "Details of E-AGCH with respect to contents and SF" TSG RAN WG1 Meeting #39, [Online] Nov. 15-19, 2004, pp. 1-4, XP00246087.

The office communication of Feb. 18, 2011, issued in the counterpart Korean patent application.

* cited by examiner

US 7,991,415 B2

TRANSMISSION RATE CONTROL METHOD, RADIO BASE STATION AND RADIO NETWORK CONTROLLER

FIELD OF THE INVENTION

The present invention relates to a transmission rate control method, a radio base station and a radio network controller for controlling a transmission rate of uplink user data.

BACKGROUND ART

As described in Non-patent Document 1, an absolute transmission rate control channel (E-AGCH: enhanced-absolute grant channel) is defined as a channel used by a radio base station in uplink enhancement to control a transmission rate of uplink user data (data to be transmitted through EDCH/E-DPDCH) from a mobile station.

Note that, in the uplink enhancement, the transmission rate of uplink user data is specified by factors such as: a transmission power ratio between an enhanced-dedicated physical data channel (E-DPDCH) used for the uplink user data and a dedicated physical control channel (DPCCH); a transmission power of the enhanced-dedicated physical data channel (E-DPDCH) used for the uplink user data; and a size of transmission data block of the uplink user data.

In the uplink enhancement, a radio base station maps, to the absolute transmission rate control channel, an absolute value of the allowable transmission rate of uplink user data from a mobile station. Then, the radio base station transmits the absolute value to each mobile station, so that the mobile station can determine the transmission rate of uplink user data based on the absolute value.

In the uplink enhancement, a radio base station generally means a cell in the radio base station if not otherwise specified. In addition, in the uplink enhancement, each mobile station UE is configured to receive an absolute transmission rate control channel (AGCH) from a serving cell of the mobile station UE.

Additionally, in the uplink enhancement, a transmission rate generally includes a size of a transport block and a transmission power ratio (ratio between the transmission power of E-DPDCH and the transmission power of DPCCH).

At this time, an effective period of the absolute transmission rate control channel (an effective period of an absolute value of the allowable transmission rate mapped to the absolute transmission rate control channel) is not particularly set, and the absolute value is valid until the reception of the next absolute transmission rate control channel.

Here, in the uplink enhancement, an effective period in general may be set according to a time elapsed since receiving the absolute transmission rate control channel (AGCH) (for example, 10 ms, 5 TTI (transmission time interval) or the like), or may be set in HARQ process units.

In an example shown in FIG. 13, HARQ processes #4 to #8 are set as an effective period of the absolute transmission rate control channel (AGCH).

For this reason, for example, when a radio base station desires a certain mobile station to stop transmitting uplink user data, the radio base station has to transmit another absolute transmission rate control channel such that the allowable transmission rate of the uplink user data of the mobile station can be set to "0 bps", to thereby cause the mobile station to stop transmitting the uplink user data.

As a result, transmission power resource in the downlink is overspent, which leads to deterioration in radio capacity.

[Non-Patent Document 1] 3GPP TSG-RAN TS25.309 V6.2.0

DISCLOSURE OF THE INVENTION

Hence, the present invention has been made in view of the above-mentioned points. An object of the present invention is to provide a transmission rate control method, a radio base station and a radio network controller, the three of which are capable of increasing the radio capacity in downlink by reducing, to 0 bps, an allowable transmission rate of uplink user data of a mobile station without transmitting the absolute transmission rate control channel. Specifically, this is achieved by setting an effective period of the absolute transmission rate control channel by layer 3 signaling, or by employing a fixed value in the system.

In addition, the present invention aims to provide a transmission control method, a radio base station and a radio network controller, which are capable of optimizing, according to conditions, the trade-off between the load caused by a control channel in the downlink and the accuracy in scheduling in the uplink, by flexibly changing the effective period by layer 3 signaling.

A first aspect of the present invention is summarized as a transmission rate control method for controlling a transmission rate of uplink user data, including: notifying, at a radio network controller, an effective period of an absolute transmission rate control channel to a radio base station and a mobile station, when a call is established or when a serving cell is changed; determining, at the radio base station, whether or not to transmit the absolute transmission rate control channel to each of mobile stations which is performing a communication with the radio base station, based on the effective period; and determining, at each of the mobile stations, the transmission rate of the uplink user data, based on an allowable transmission rate mapped to the absolute transmission rate control channel notified by the radio base station.

A second aspect of the present invention is summarized as a transmission rate control method for controlling a transmission rate of uplink user data, including: determining, at a radio base station, whether or not to transmit an absolute transmission rate control channel to each of mobile stations which is performing a communication with the radio base station, based on a predetermined effective period; and determining, at each of the mobile stations, the transmission rate of the uplink user data, based on an allowable transmission rate mapped to the absolute transmission rate control channel notified by the radio base station.

A third aspect of the present invention is summarized as a radio base station used in a transmission rate control method for controlling a transmission rate of an uplink user data, including: a determination section configured to determine whether or not to transmit an absolute transmission rate control channel to each of mobile stations which is performing a communication with the radio base station, based on an effective period of an absolute transmission rate control channel notified by a radio network controller, when a call is established or when a serving cell is changed.

A fourth aspect of the present invention is summarized as a radio base station used in a transmission rate control method for controlling a transmission rate of uplink user data, including a determination section configured to determine whether or not to transmit an absolute transmission rate control channel to each of mobile stations which is performing a communication with the radio base station, based on a predetermined effective period.

A fifth aspect of the present invention is summarized as a radio network controller used in a transmission rate control method for controlling a transmission rate of uplink user data, including a notification section configured to notify an effective period of an absolute transmission rate control channel transmitted to each of mobile stations which is performing a communication with a radio base station, when a call is established or when a serving cell is changed.

BEST MODES FOR CARRYING OUT THE INVENTION

Figure 1:
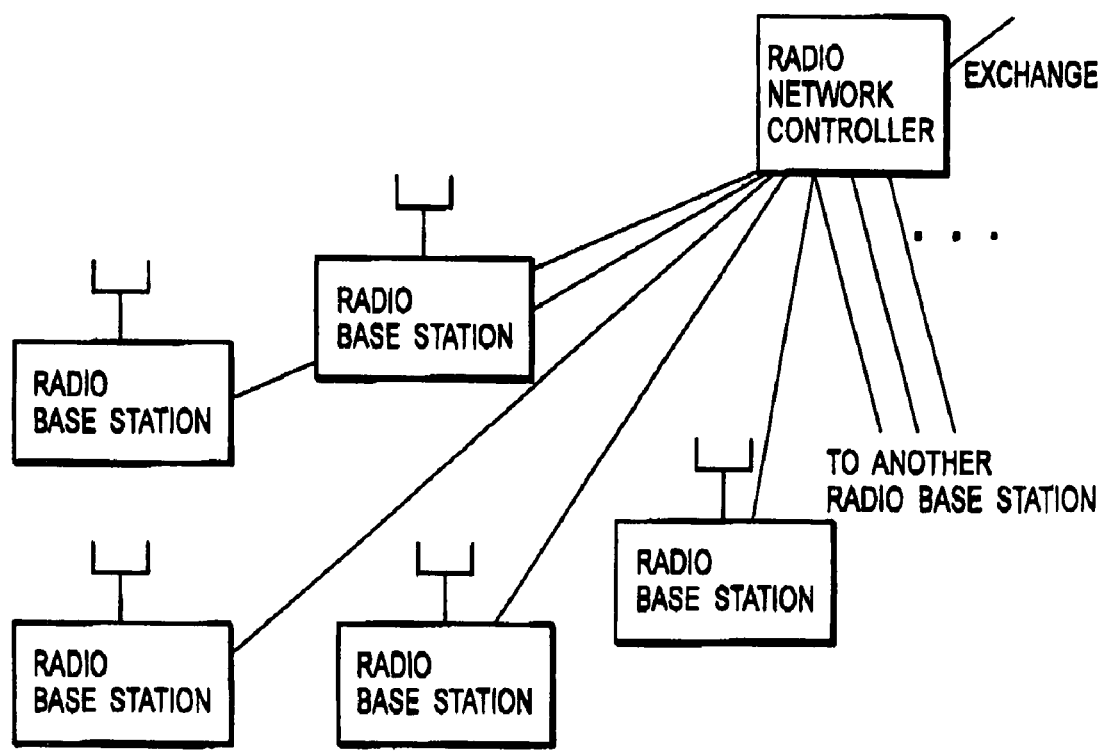
FIG. 1 is a configuration block diagram of a transmission rate control system according to an embodiment of the present invention.
Figure 2A:
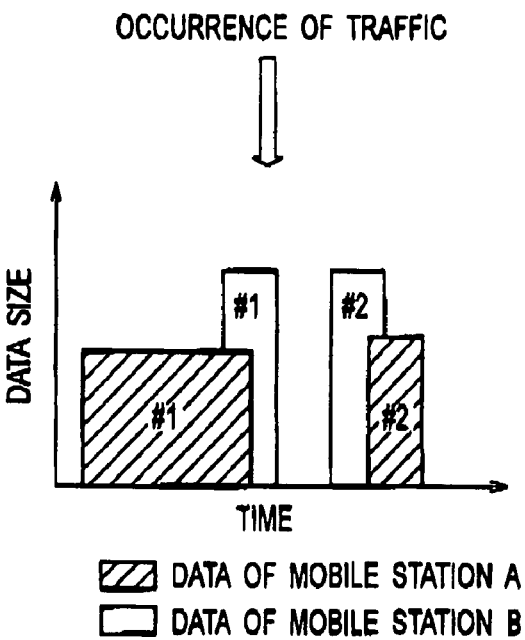
FIGS. 2(a) to 2(c) are diagrams for explaining data transmission from mobile stations according to the embodiment of the present invention.
Figure 2B:
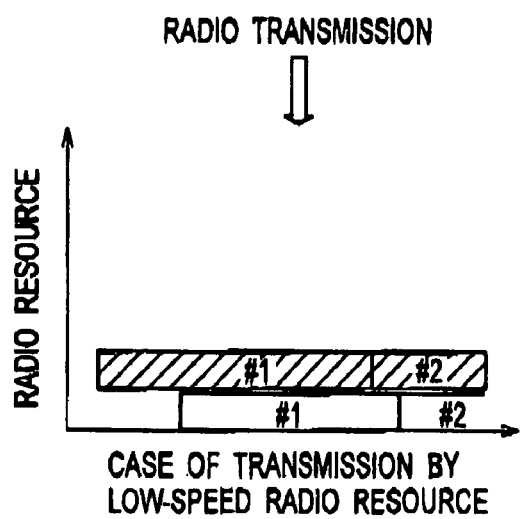
Figure 2C:
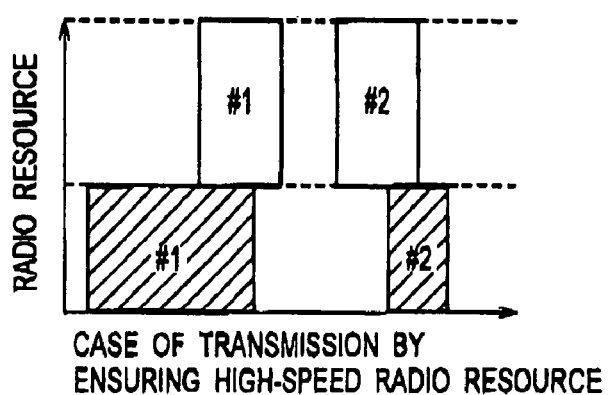

Hereinafter, an explanation will be given for an embodiment of the present invention with reference to the drawings. The same or similar reference numerals are given to the same or similar portions in the drawings below. Note that the drawings are expressed schematically.

First Embodiment

An explanation will be given for a transmission rate control system according to a first embodiment of the present invention with reference to FIGS. 4 to 12.

Figure 4:
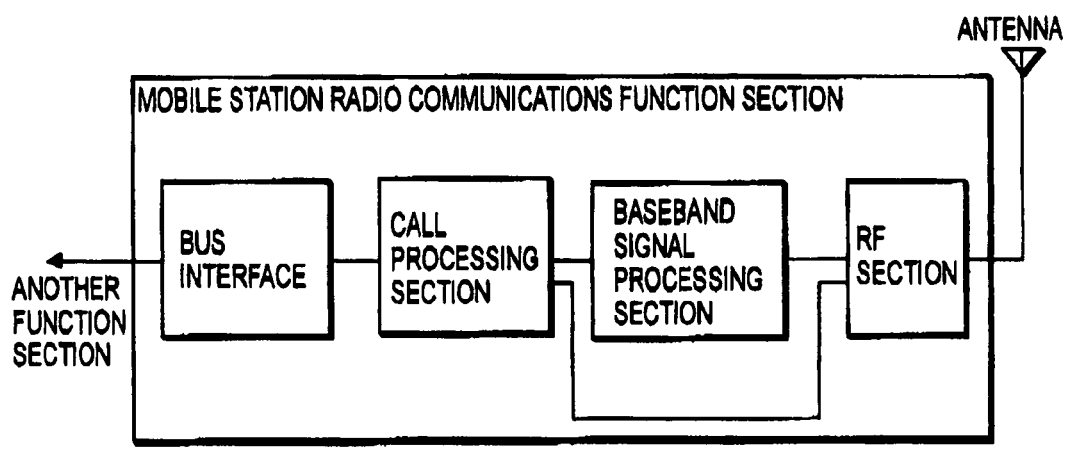
FIG. 4 is a configuration block diagram of a mobile station radio communications function section according to the embodiment of the present invention.

As shown in FIG. 4, a mobile station radio communications function section provided in a mobile station of the transmission rate control system according to the first embodiment of the present invention includes a bus interface, a call processing section, a baseband signal processing section and an RF section.

Figure 5:
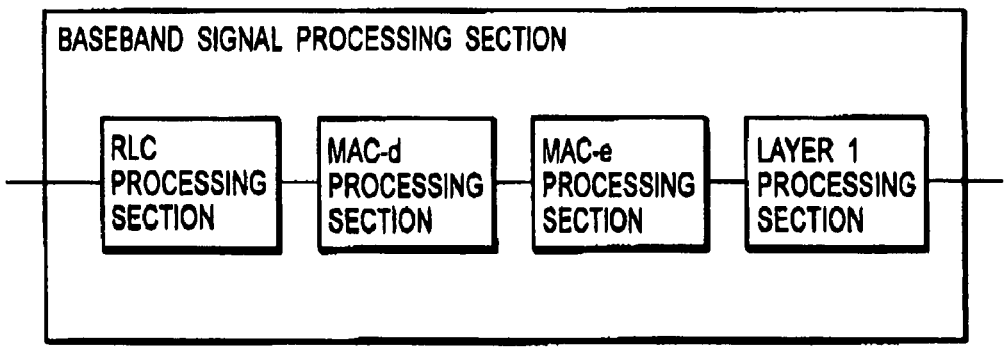
FIG. 5 is a configuration block diagram of a baseband signal processing section according to the embodiment of the present invention.

Additionally, as shown in FIG. 5, the baseband signal processing section includes a RLC processing section, a MAC-d processing section, a MAC-e processing section and a layer 1 processing section.

Figure 6:
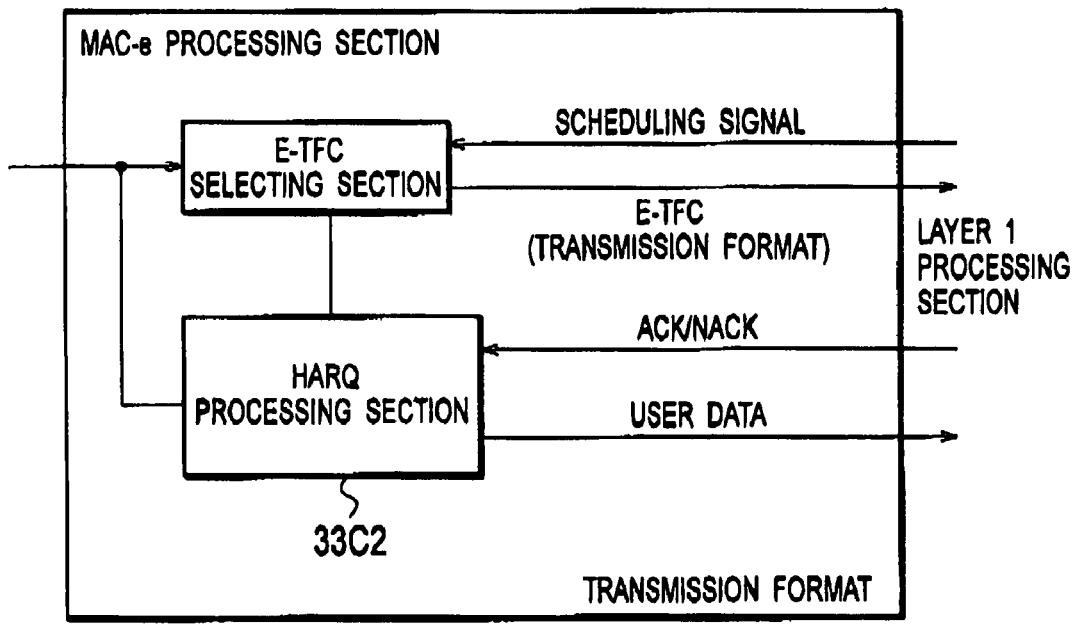
FIG. 6 is a configuration block diagram of a MAC-e section according to the embodiment of the present invention.

Moreover, as shown in FIG. 6, the MAC-e processing section includes an E-TFC selecting section and a HARQ processing section.

Here, the E-TFC selecting section is configured to receive scheduling signals such as an absolute transmission rate control channel (E-AGCH) and a relative transmission rate control channel (E-RGCH) transmitted from a radio base station (cell), and to control the transmission rate of uplink user data of a mobile station (specifically, to select a transmission format (E-TFC)). The E-TFC selecting section controls the transmission rate based on an absolute value of the maximum allowable transmission rate of uplink user data of the mobile station included in the E-AGCH, and a relative value (Up/Down/Keep) of the maximum allowable transmission rate of uplink user data of the mobile station included in the E-RGCH.

Figure 7:
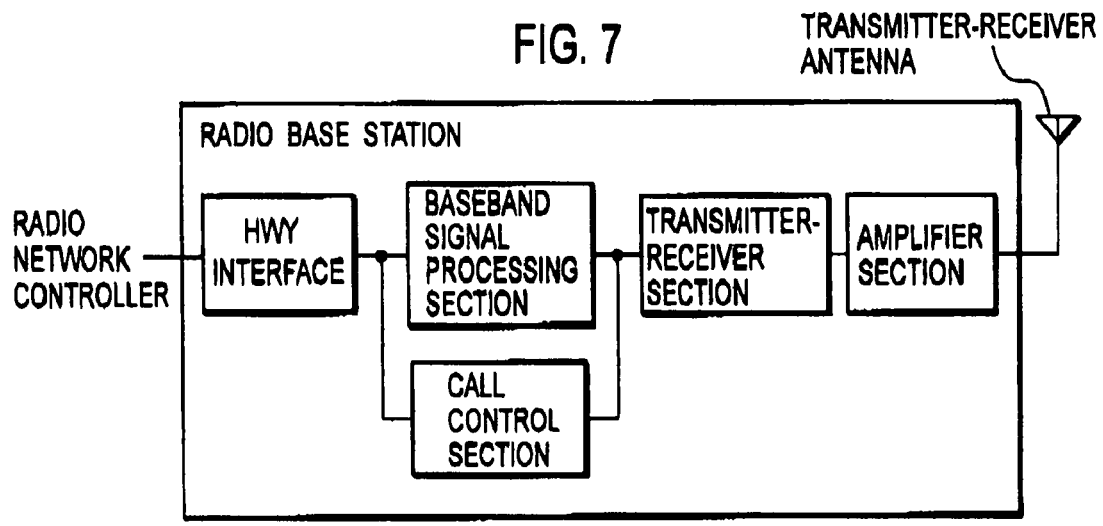
FIG. 7 is a configuration block diagram of a radio base station according to the embodiment of the present invention.
Figure 8:
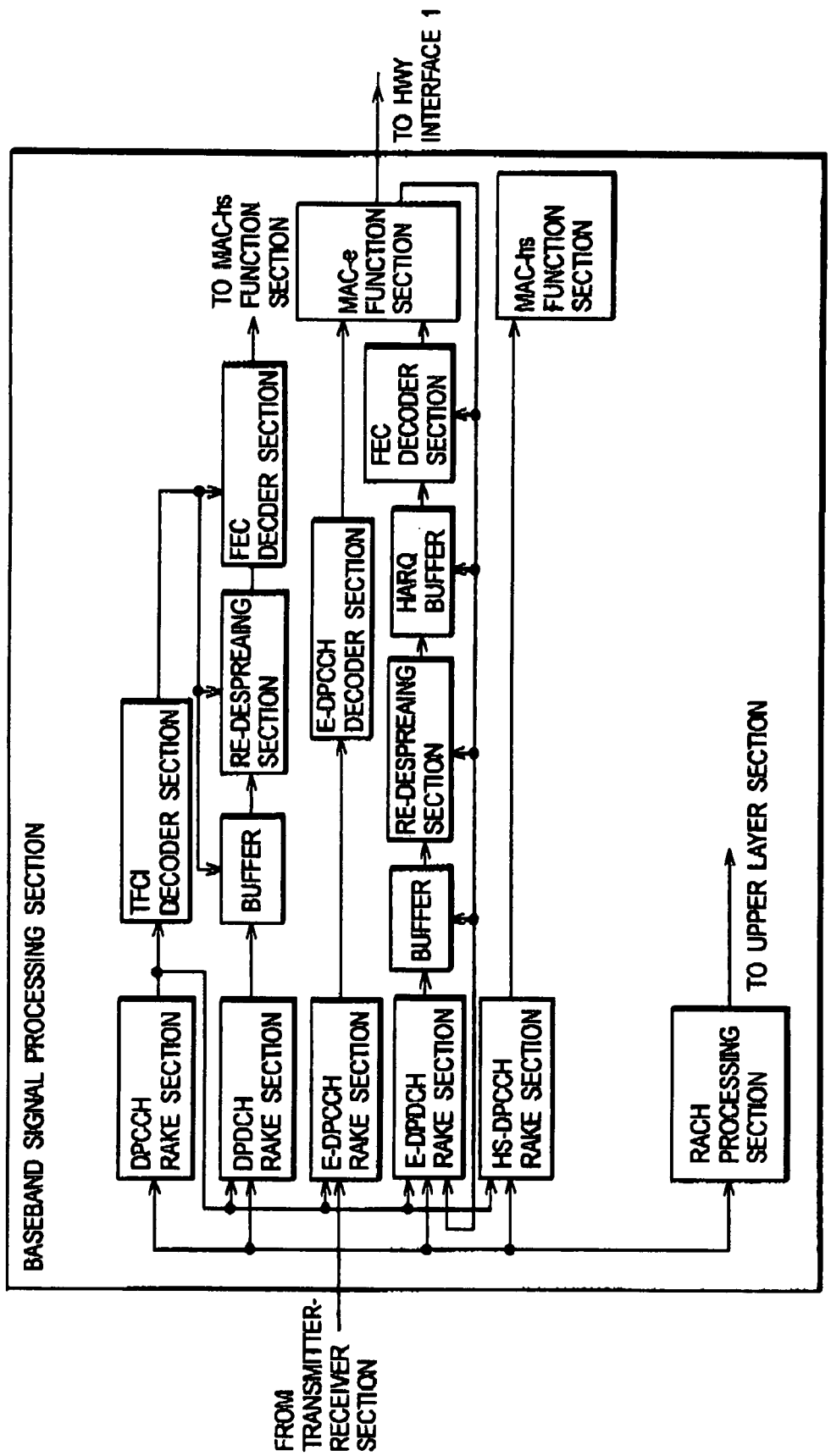
FIG. 8 is a configuration block diagram of a baseband signal processing section according to the embodiment of the present invention.

As shown in FIG. 7, the radio base station (corresponding to each cell) in the transmission rate control system according to the first embodiment of the present invention includes a HWY interface, a baseband signal processing section, a call control section, a transmitter-receiver section and an amplifier section. Here, FIG. 8 shows a specific configuration example of the baseband signal processing section related to the present invention.

Figure 9:
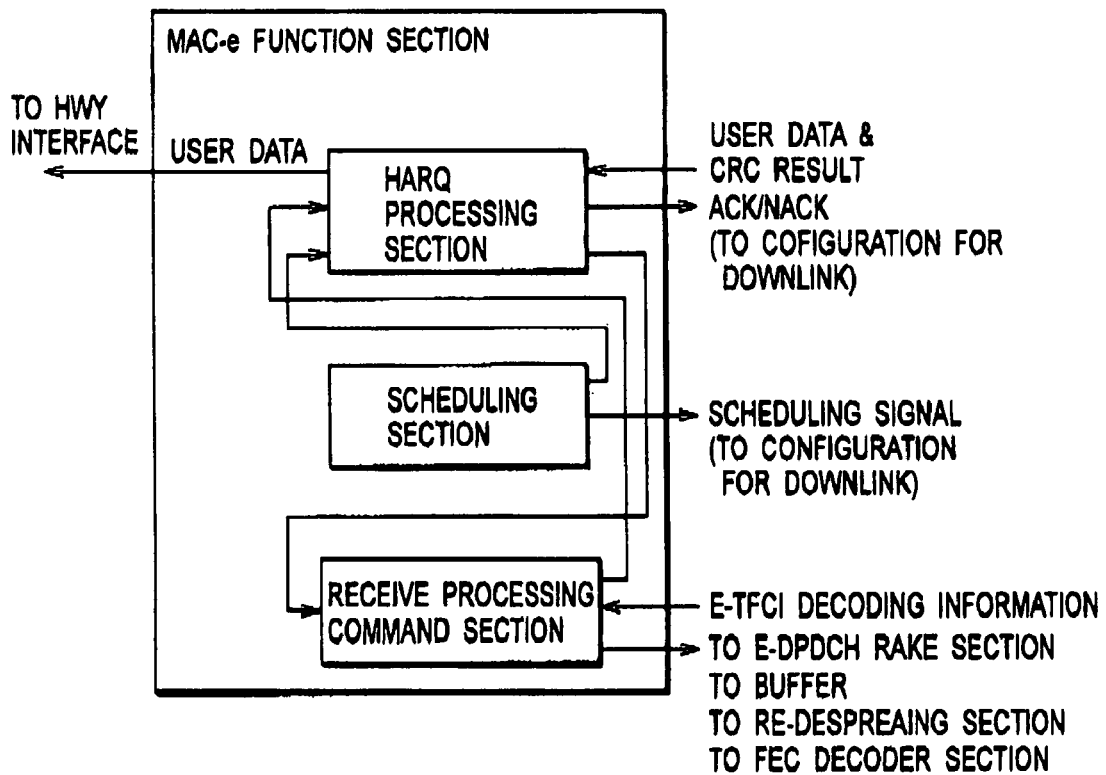
FIG. 9 is a configuration block diagram of a MAC-e function section according to the embodiment of the present invention.

In addition, as shown in FIG. 9, a MAC-e function section provided in the baseband signal processing section includes a HARQ processing section, a scheduling section and a receive processing command section.

Here, the scheduling section is configured to control the transmission rate of uplink user data of each mobile station, by transmitting, to each mobile station, the above-mentioned absolute transmission rate control channel or the relative transmission rate control channel.

In addition, the scheduling section is configured to determine whether or not to transmit the absolute transmission rate control channel to each mobile station which is performing a communication with the radio base station (cell) that the scheduling section itself belongs to. The scheduling section makes the determination based on an effective period of the absolute transmission rate control channel, the effective period notified by the radio network controller when a call is established or when a serving cell is changed.

Otherwise, the scheduling section may be configured to determine whether or not to transmit the absolute transmission rate control channel to each mobile station which is performing a communication with the radio base station (cell) to which the scheduling section itself belongs, based on an effective period determined in advance in the transfer rate control system.

Note that the effective period may be designated in time units (for example, 10 seconds or the like), be designated in TTI units (for example, 3 TTIs or the like), be designated by use of a start time and an end time, or be designated in a format indicating a time when a certain condition is satisfied.

Figure 10:
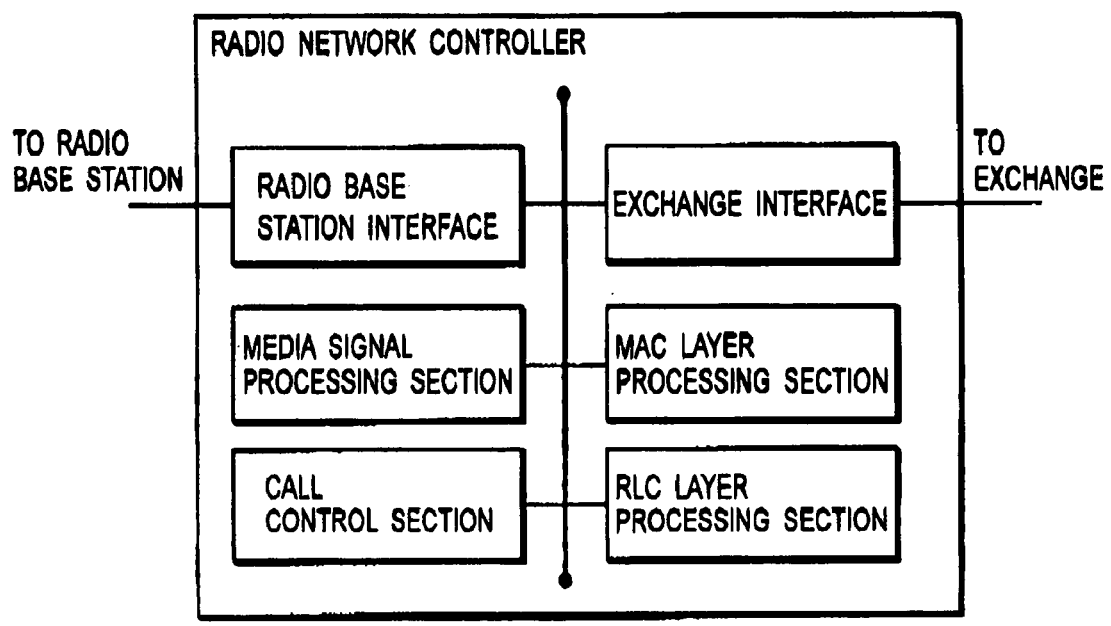
FIG. 10 is a configuration block diagram of a radio network controller according to the embodiment of the present invention.

As shown in FIG. 10, the radio network controller includes a radio base station interface, an exchange interface, a media signal processing section, a MAC layer processing section, a call control section and an RLC layer processing section.

The call control section is configured to notify an effective period of the absolute transmission rate control channel, which is transmitted to each mobile station which is performing a communication with each of the radio base stations (cells), when a call is established or when a serving cell is changed.

Figure 3:
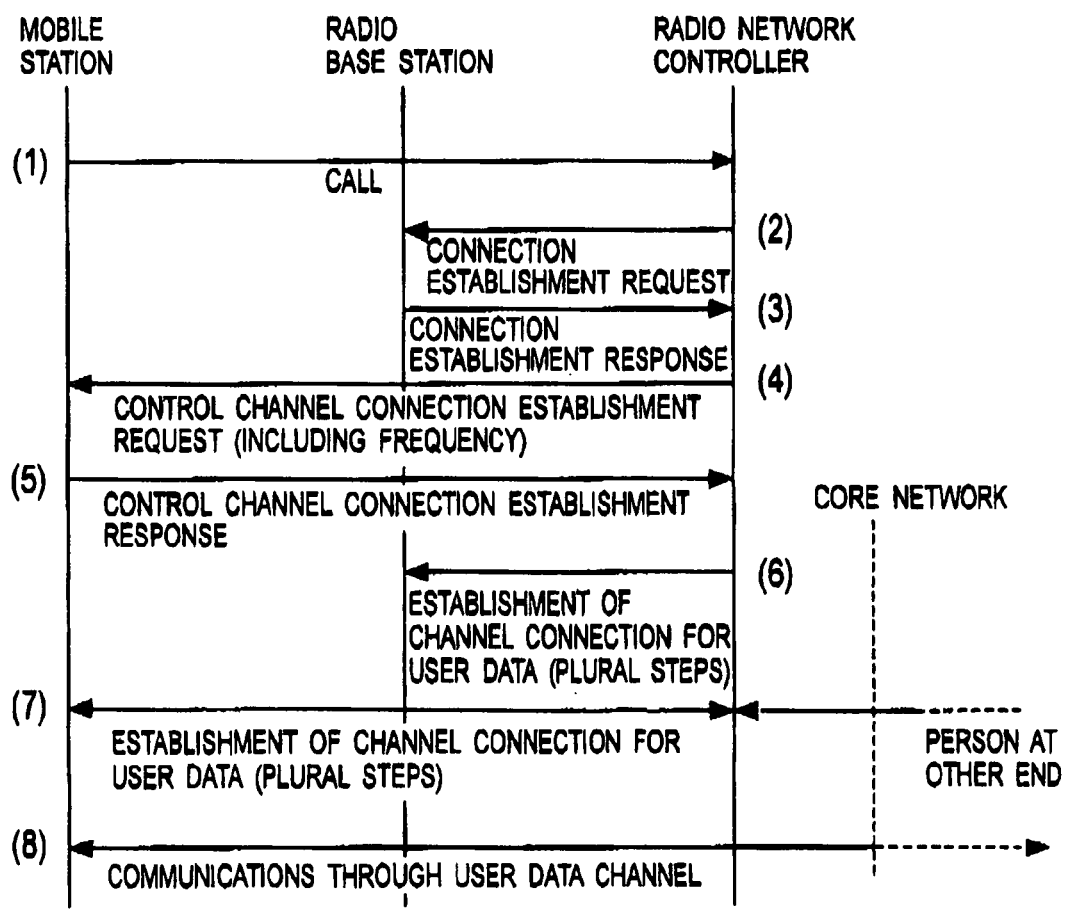
FIG. 3 is a sequence diagram showing a transmission rate control method according to the embodiment of the present invention.

FIG. 3 shows a sequence example of the transmission rate control method according to the present invention. Although FIG. 3 shows an example of the mobile station originating a call, the mobile station receiving a call can also be considered as an example.

In step (1), the mobile station requests the radio network controller to start communications by use of the EDCH (that is, to establish a call).

In step (2), in response to the request, the radio network controller transmits a request to establish a connection using the EDCH to the radio base station that controls the mobile station. Then in step (3), if the connection is successfully established, the radio base station returns a connection establishment response indicating the success to the radio network controller.

In step (4), the radio network controller transmits, to the mobile station, a control channel connection establishment request for an establishment of the control channel. This control channel is used for transmitting and receiving information related to call types, the release numbers of mobile stations, and the transmission rates of transmittable and receivable user data.

If the control channel is established in accordance with the control channel connection establishment request, the mobile station notifies the radio network controller of a control channel connection establishment response indicating the establishment in step (5).

After the establishment of the control channel, in step (7), various parameters related to the EDCH (such an amplitude ratio for each format) are exchanged between the radio network controller and the mobile station, and thus the transmission of uplink user data is started. During this exchanging process, the radio network controller performs signaling to notify the mobile station of the effective period of the absolute transmission rate control channel.

Also in step (6), various parameters related to the EDCH (such an amplitude ratio for each format) are exchanged between the radio network controller and the radio base station. In this step, the radio network controller also performs signaling to notify the radio base station of the effective period of the absolute transmission rate control channel.

With reference to FIG. 3, the example has been described of a case where the transmission rate control method of the present invention is applied when a call is established. However, it should be noted that the present invention is not limited to this case, and that the method may also be similarly applied when a serving cell is changed.

Incidentally, when the radio network controller judges, based on a measurement report on the mobile cell, that the serving cell of the mobile station should be changed, the serving cell is changed to another cell by establishing the EDCH between the mobile station and the cell to serve as the serving cell after the change, and then by releasing the EDCH between the mobile station and the cell having served as the serving cell before the change.

Figure 11:
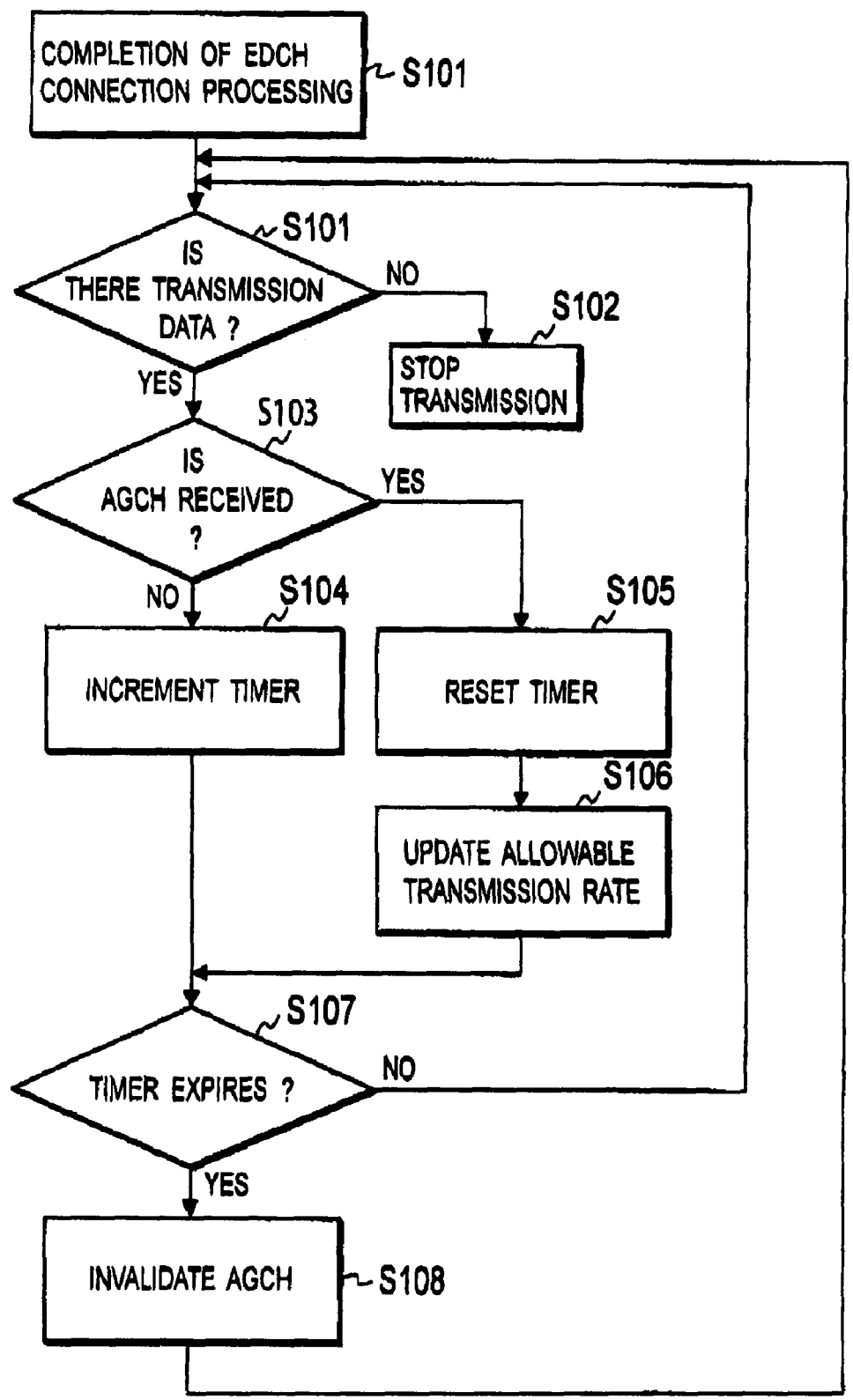
FIG. 11 is a flowchart showing a transmission rate control method according to the embodiment of the present invention.

FIG. 11 shows a flowchart of operations of the mobile station in the transmission rate control method according to the present invention.

After completion of the connection processing for EDCH (processing for establishing the call or processing for changing the serving cell), the mobile station starts transmitting the uplink user data through the EDCH in step S101 when having user data to be transmitted.

Then, in a case of receiving the AGCH in step S103, the mobile station resets a timer in step S105, and transmits uplink user data in step S106, based on the allowable transmission rate mapped to the AGCH.

Alternatively, in the case of not receiving the AGCH in step S103, the mobile station increments the timer.

Thereafter, if the timer has not expired (that is, if the time is within the effective period of the AGCH received most recently) in step S107, the mobile station continues to transmit the uplink user data based on the allowable transmission rate (the absolute value of the transmission rate of the uplink user data) mapped to the AGCH (step S101).

In contrast, if the timer has expired (that is, if the time is not within the effective period of the AGCH received most recently) in step S107, the mobile station invalidates the allowable transmission rate mapped to the AGCH, in step S10.

In step S108, if the minimum allowable transmission rate is set in advance, the mobile station transmits the uplink user data at the minimum allowable transmission rate. If the minimum allowable transmission rate is not set, the mobile station stops transmitting the uplink user data.

Figure 12:
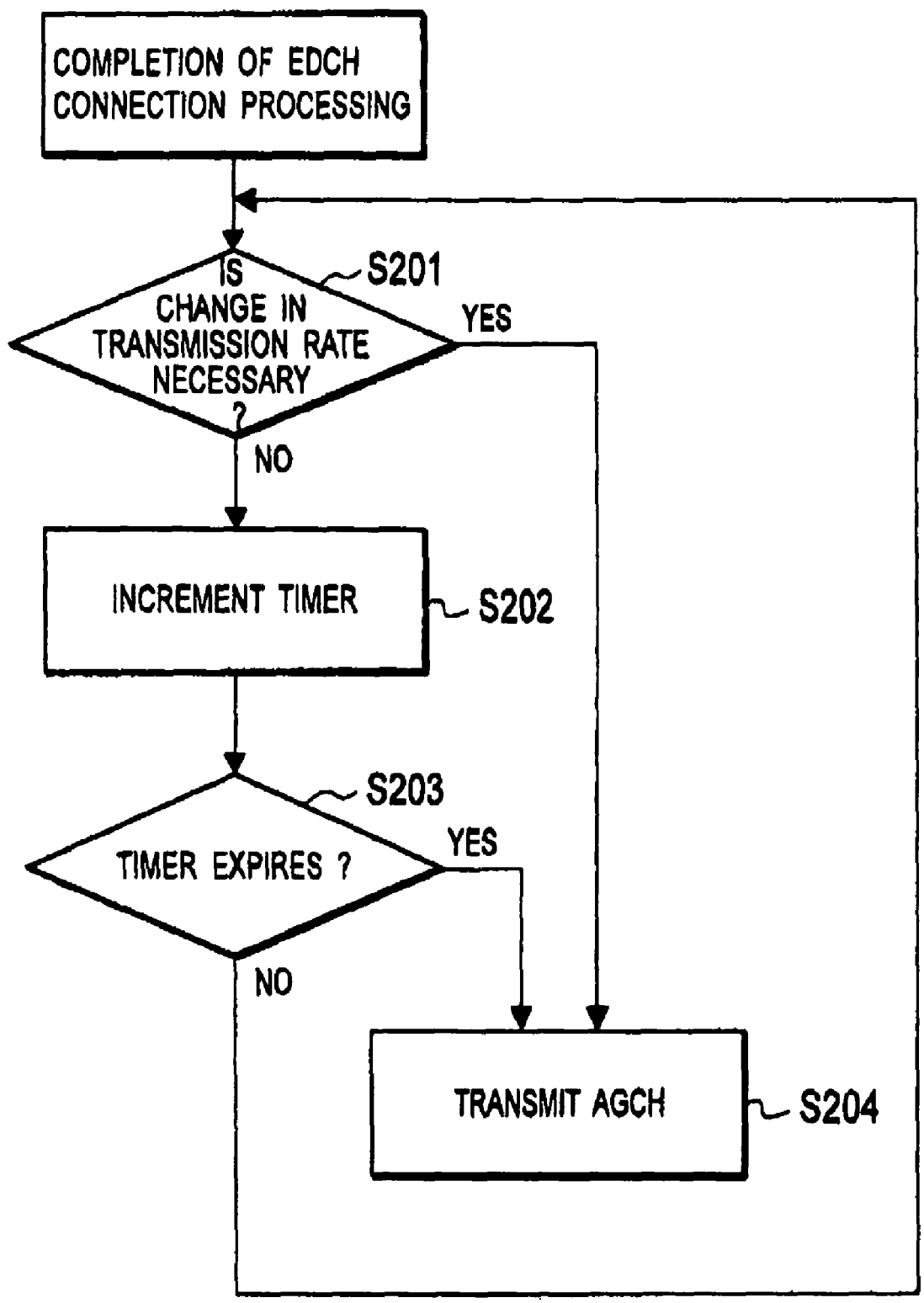
FIG. 12 is a flowchart showing the transmission rate control method according to the embodiment of the present invention.
Figure 13:
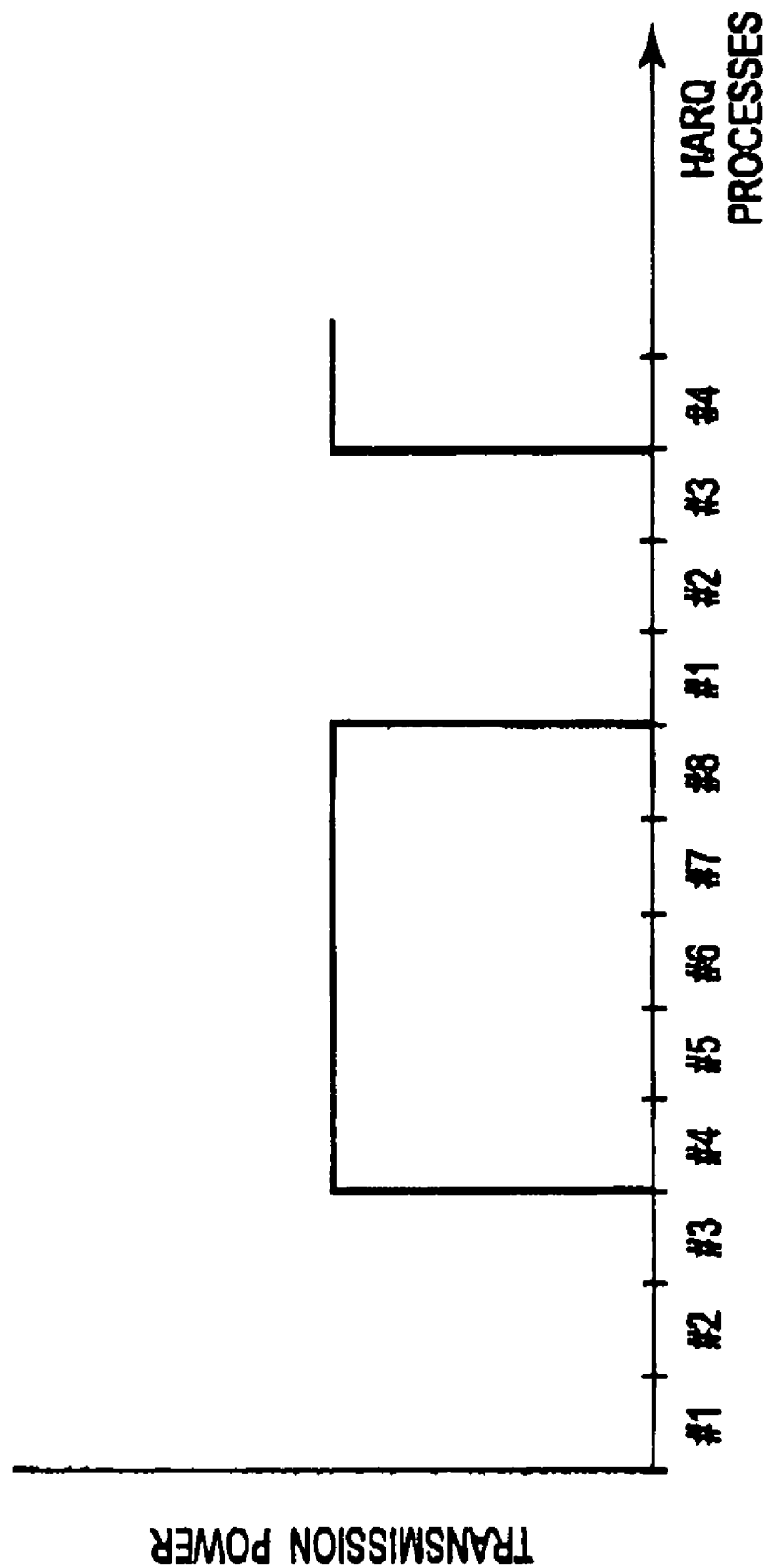
FIG. 13 is a diagram showing an example of a HARQ of which an effective period is set, in a general mobile communication system employing EUL.

FIG. 12 shows a flowchart of operations of the radio base station in the transmission rate control method according to the present invention.

In a case of connecting the EDCH (after completion of processing for establishing the call or processing for changing the serving cell), the radio base station (the serving cell of each mobile station) transmits the AGCH in step S204 if the allowable transmission rate in each mobile station needs to be changed in step S201.

Meanwhile, in a case where in step S201 the allowable transmission rate in each mobile station does not need to be changed, such as a case where the AGCH is already transmitted, the radio base station increments the timer in step S202.

If the timer has expired (that is, if the time is not within the effective period of the AGCH) in step S203, the radio base station transmits the AGCH again in step S204.

As has been described, according to the transmission rate control method according to the present embodiment, the radio capacity in the downlink can be increased by reducing, to 0 bps, the transmission rate of uplink user data of a mobile station, without transmission of the AGCH. Specifically, this is achieved by employing an effective period of the AGCH set by layer 3 signaling, or a fixed effective period of the AGCH in the system.

Additionally, according to the transmission rate control method according to the present embodiment, the trade-off between the load caused by a control channel in the downlink and the accuracy in scheduling in the uplink can be optimized, as needed, by flexibly changing the effective period by layer 3 signaling.

Hereinabove, the present invention has been explained in detail with reference to the embodiment. However, it is obvious to those skilled in the art that the present invention is not limited to the embodiment described in the present application. An apparatus of the present invention can be implemented as an embodiment modified and improved without departing from the spirit and scope of the present invention, defined by the description in the scope of claims. Accordingly, the description in the present application aims for exemplar illustration, and is not intended at all to limit the present invention.

INDUSTRIAL APPLICABILITY

As described above, the present invention can provide a transmission rate control method, a radio base station and a radio network controller, the three of which are capable of increasing the radio capacity in downlink by reducing, to 0 bps, an allowable transmission rate of uplink user data of a mobile station without transmitting the absolute transmission rate control channel. Specifically, this is achieved by setting an effective period of the absolute transmission rate control channel by layer 3 signaling, or by employing a fixed value in the system.

In addition, the present invention aims to provide a transmission control method, a radio base station and a radio network controller, which are capable of optimizing, according to conditions, the trade-off between the load caused by a control channel in the downlink and the accuracy in scheduling in the uplink, by flexibly changing the effective period by layer 3 signaling.

The invention claimed is:

1. A transmission rate control method for controlling a transmission rate of uplink user data, comprising:
   notifying, from a radio network controller to a mobile station, an effective period of an allowable transmission rate included in an absolute transmission rate control channel, when a call is established for the mobile station or when a serving cell for the mobile station is changed;
   receiving, at the mobile station, the allowable transmission rate included in the absolute transmission rate control channel transmitted from the radio base station; and
   determining, at the mobile stations, a transmission rate for transmitting the uplink user data from the mobile station, based on the notified effective period and the allowable transmission rate included in the absolute transmission rate control channel transmitted from the radio base station.

2. A mobile station used in a transmission rate control method for controlling a transmission rate of an uplink user data, comprising:
   a receiving section configured to receive an allowable transmission rate included in an absolute transmission rate control channel transmitted from the radio base station, and
   a determination section configured to determine the transmission rate for transmitting the uplink user data, based on an effective period of the allowable transmission rate included in the absolute transmission rate control channel and the allowable transmission rate included in the absolute transmission rate control channel transmitted from a radio base station, the effective period being notified from a radio network controller, when a call is established for the mobile station or when a serving cell for the mobile station is changed.

3. A radio base station used in a transmission rate control method for controlling a transmission rate of an uplink user data, comprising:
   a determination section configured to determine whether or not to transmit an allowable transmission rate via an absolute transmission rate control channel to each of mobile stations which is performing a communication with the radio base station, based on an effective period of the allowable transmission rate included in the absolute transmission rate control channel, the effective period being notified from a radio network controller, when a call is established for the mobile station or when a serving cell for the mobile station is changed.

4. A radio network controller used in a transmission rate control method for controlling a transmission rate of uplink user data, comprising:
   a notification section configured to notify, to a mobile station, an effective period of an allowable transmission rate included in an absolute transmission rate control channel when a call is established for the mobile station or when a serving cell for the mobile station is changed.

5. The transmission rate control method according to claim 1 wherein the effective period can be set in terms of a HARQ process.

6. The mobile station according to claim 2 wherein the effective period can be set in terms of a HARQ process.

7. The radio base station according to claim 3 wherein the effective period can be set in terms of a HARQ process.

8. The radio network controller according to claim 4 wherein the effective period can be set in terms of a HARQ process.

9. A transmission rate control system using a transmission rate control method for controlling a transmission rate of uplink user data, wherein
   a radio network controller comprises a notification section configured to notify, to a mobile station, an effective period of an allowable transmission rate included in an absolute transmission rate control channel, when a call is established for the mobile station or when a serving cell for the mobile station is changed; and the mobile station comprises a receiving section configured to receive the allowable transmission rate included in the absolute transmission rate control channel transmitted from a radio base station, and a determination section configured to determine a transmission rate for transmitting the uplink user data, based on the notified effective period and the allowable transmission rate included in the absolute transmission rate control channel transmitted from the radio base station.

* * * * *